United States Patent [19]

Kienböck et al.

[11] Patent Number: 5,320,070
[45] Date of Patent: Jun. 14, 1994

[54] METHOD AND DEVICE FOR USING EXCESS HEAT NOT REQUIRED FOR OPERATING A DESULFURIZATION DEVICE

[75] Inventors: Martin Kienböck, Ratingen; Manfred Kehr, Haltern, both of Fed. Rep. of Germany

[73] Assignee: Balcke-Dürr Aktiengesellschaft, Ratingen, Fed. Rep. of Germany

[21] Appl. No.: 937,344

[22] Filed: Aug. 27, 1992

[30] Foreign Application Priority Data

Mar. 21, 1992 [DE] Fed. Rep. of Germany ....... 4209234
Jul. 2, 1992 [DE] Fed. Rep. of Germany ... 9208823[U]

[51] Int. Cl.$^5$ ............................................. F22B 33/00
[52] U.S. Cl. ................................. 122/1 R; 122/1 A; 122/468; 122/470; 122/7 R
[58] Field of Search ............... 122/1 R, 7 R, 468, 470, 122/1 A, 20 B; 110/216

[56] References Cited

U.S. PATENT DOCUMENTS 4,362,129 12/1982 Banfi et al. .................. 122/470 X
4,875,436 10/1989 Smith et al. .................. 122/468 X

FOREIGN PATENT DOCUMENTS 3505952 2/1985 Fed. Rep. of Germany .

Primary Examiner—Edward G. Favors
Attorney, Agent, or Firm—Robert W. Becker & Associates

[57] ABSTRACT

A method and a device for using excess heat of flue gas that is not required for operating a flue gas desulfurization device of a power plant is presented. Before being introduced into the flue gas desulfurization device. The flue gas is guided through preheaters for heating the combustion air and an electrostatic filter. The combustion air preheating step is achieved with two air preheaters, one arranged upstream of the electrostatic filter and one arranged downstream of the electrostatic filter. A partial flue gas stream is branched off at least before the first air preheater arranged upstream of the electrostatic filter. The partial flue gas stream is used to generate steam.

23 Claims, 4 Drawing Sheets

METHOD AND DEVICE FOR USING EXCESS HEAT NOT REQUIRED FOR OPERATING A DESULFURIZATION DEVICE

BACKGROUND OF THE INVENTION

The present invention relates to a method for using excess heat of flue gas that is not required for operating a flue gas desulfurization device, the flue gas being introduced into an air preheater and an electrostatic filter before entering the desulfurization device.

The present invention further relates to a device for using excess heat of flue gas not required for operating the flue gas desulfurization device, the device having an air preheater and an electrostatic filter upstream of the desulfurization device.

In known power plants provided with a flue gas desulfurization device the combustion air which is introduced into the steam generator is first guided through an air preheater in order to improve the degree of efficiency of the power plant, whereby the air preheater is heated by the flue gas exiting from the steam generator. The thus cooled flue gas is usually scrubbed by an electrostatic filter before being introduced into the flue gas desulfurization device. The desulfurized flue gas is then released into the atmosphere via a flue gas smoke stack or a cooling tower. The release of the scrubbed flue gas via a cooling tower is advantageous because the flue gas which has been cooled during the scrubbing process within the desulfurization device and has been laden with moisture may be released into the atmosphere without requiring a directed reheating of the flue gas.

In power plants with steam generators that are primarily fueled with fossil fuels a great flue gas volume relative to the volume of combustion air is produced. With brown coal power plants this ratio is approximately 1.6 to 1. Since for the prevention of corrosion a certain difference between the exhaust gas temperature and the acid due point must be observed, the flue gas temperature after leaving the electrostatic filter is approximately 170° C. for such power plants.

Since on the other hand the required temperature for the flue gas desulfurization process is approximately 110° C., in known power plants the temperature of flue gas before entering the flue gas desulfurization device is reduced from 170° C. to approximately 110° C. by injecting water. However, this results in a loss of efficiency of approximately 3% occurs. For a brown coal power plant with an electric power output of 800 MW, i.e., a thermal power output of approximately 2400 MW, the aforementioned loss of efficiency due to reduction of the excess heat by injecting water into the flue gas is thus approximately 80 MW of thermal efficiency, i.e., approximately 3% of the total efficiency of the brown coal power plant.

It is therefore an object of the present invention to provide a method and a device of the aforementioned kind with which the excess heat not needed for the operation of the flue gas desulfurization device may be utilized.

BRIEF DESCRIPTION OF THE DRAWINGS

This object, and other objects and advantages of the present invention, will appear more clearly from the following specification in conjunction with the accompanying drawings, in which:

FIG. 1 shows a first embodiment of the inventive device;

FIG. 2 shows a second embodiment of the inventive device;

SUMMARY OF THE INVENTION

Figure 1A:
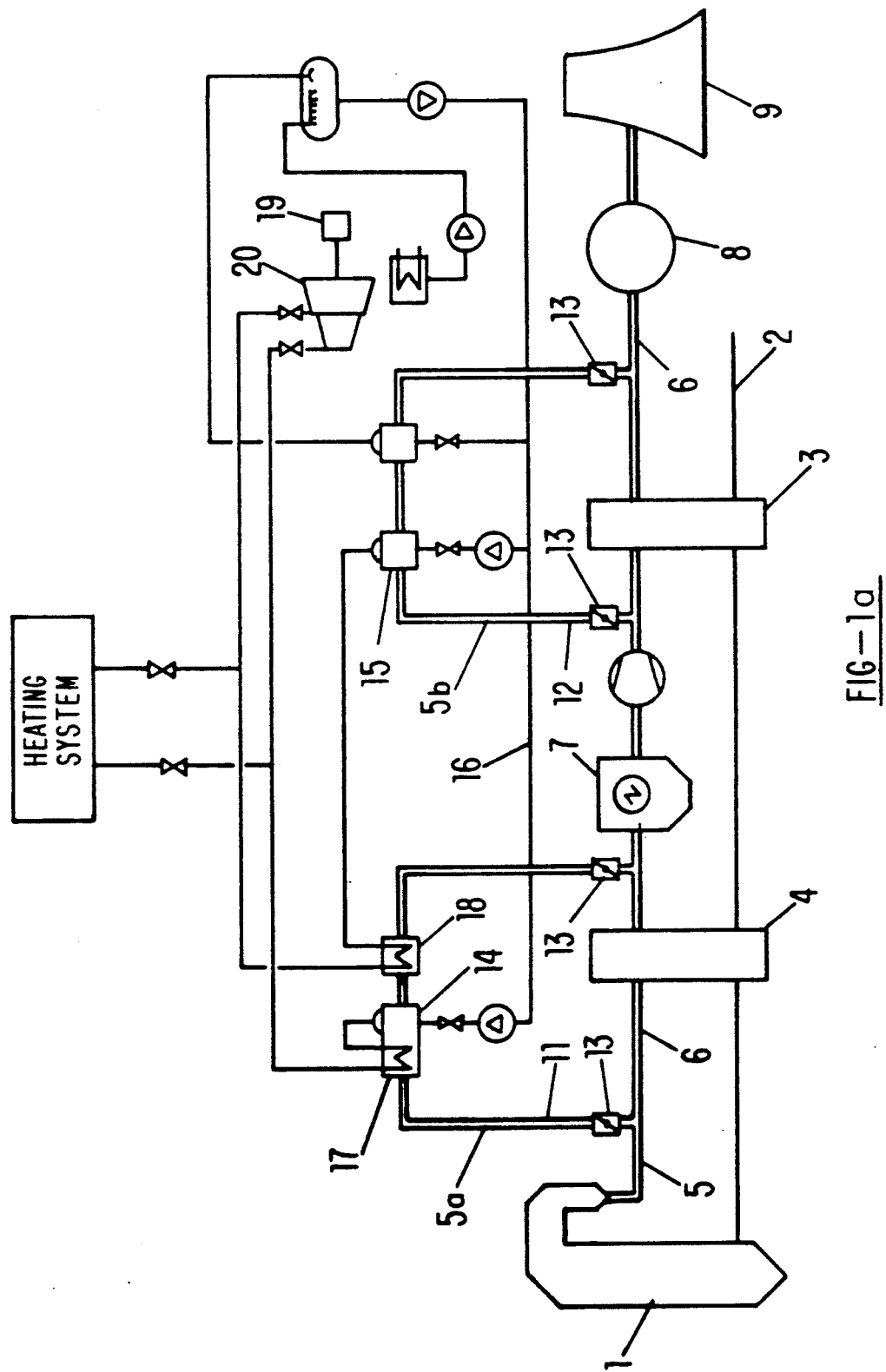
FIG. 1a shows a variant of the first embodiment in which the steam is used for heating.

The method for using excess heat according to the present invention is primarily characterized by the following steps:

guiding the flue gas through a main flue gas line into an electrostatic filter before introducing the flue gas into the flue gas desulfurization device;

guiding the flue gas through a first and a second air preheater before introducing the flue gas into the flue gas desulfurization device;

arranging the first and the second air preheater upstream and optionally downstream of the electrostatic filter in the main flue gas line;

branching off a partial flue gas stream at least before one of the first and second air preheaters that is arranged upstream of the electrostatic filter, the partial flue gas stream corresponding approximately to the excess heat; and using the partial flue gas stream for generating steam.

According to the present invention it is thus provided that the preheating step is carried out by two preheaters which are arranged upstream, respectively, downstream of the electrostatic filter within the main flue gas line and that a partial flue gas stream corresponding to the excess heat is branched off at least before the preheater arranged upstream of the electrostatic filter and is used for generating steam.

Due to the inventive division of the preheating step now carried out with two preheaters and the bypassing of at least one preheater by the branched-off partial flue gas flow, the flue gas/air ratio within this preheater is approximately 1. On the one hand, a more economic dimensioning of the preheater and, on the other hand, the use of the excess heat of the flue gas, which is not necessary for the operation of the downstream desulfurization device, by employing the branched-off partial flue gas stream for generating steam or, alternatively, for preheating feed water, for example, in a high pressure or low pressure economizer, or for other heating purposes is thus possible. The power output gained by this method is approximately 2 to 3% of the total output of the power plant.

In a further embodiment of the present invention, a further partial flue gas stream is branched off at the other one of the first and the second preheaters, the further partial flue gas stream corresponding approximately to the excess heat for generating steam.

The method further comprises the step of using the steam generated by the amount of flue gas for heating purposes. This can be done by supplying the steam to a separate heating system or by using the steam for heating the heat exchangers of the power plant. Alternatively, it is also possible to use the excess heat, respectively, the steam generated therewith, for the turbines of the power plant or for additional auxiliary turbines. In the latter case the auxiliary turbine is preferably a dual pressure turbine. This is advantageous because the steam generators coordinated with the two bypass lines generate steam of varying pressures.

The device for using excess heat of flue gas according to the present invention is primarily comprised of:

a main flue gas line connected to the desulfurization device;

an electrostatic filter connected upstream of the desulfurization device within the main flue gas line;

a first air preheater connected upstream of the electrostatic filter within the main flue gas line and a second air preheater connected downstream of the electrostatic filter and upstream of the desulfurization device within the main flue gas line; and a first bypass line connected upstream of the first air preheater to the main flue gas line for branching off a partial flue gas stream corresponding approximately to the excess heat. Preferably, the device further comprises a control valve within the first bypass line.

Advantageously, the second preheater further comprises a heat-receiving part and a heat-dissipating part, the heat-receiving part connected to the main flue gas line and the heat-dissipating part connected to a combustion airline of the power plant, and pipelines connecting the heat-receiving part and the heat-dissipating part to one another.

In a further embodiment of the present invention the device comprises a steam-heated auxiliary heat exchanger connected to the pipelines.

Advantageously, the amount of flue gas is used for generating steam. Preferably the steam is used for heating; however, it is also possible to introduce the steam into a turbine of the power plant.

The device may also comprise a further auxiliary turbine whereby the steam is introduced into this auxiliary turbine. Preferably, the auxiliary turbine is a dual pressure turbine.

In an advantageous embodiment of the present invention, the device further comprises a second bypass line connected upstream of the second preheater within the main flue gas line for branching off a further amount of flue gas corresponding approximately to the excess heat. Preferably, a first control valve is provided within the first bypass line and a second control valve is provided within the second bypass line.

The device may further comprise a first steam generator with a coordinated first steam super heater connected within the first bypass line and a second steam generator with a coordinated second steam super heater connected within the second bypass line, said coordinated first and second steam super heaters connected within said first bypass line.

Preferably the first and further partial flue gas streams are used for generating steam. The steam may be used for heating purposes or may be introduced into a turbine of the power plant. It is also possible that the device further comprises an auxiliary turbine and the steam is introduced into the auxiliary turbine. Preferably, the auxiliary turbine is a dual pressure turbine.

According a preferred embodiment of the present invention the second air preheater is also provided with a bypass line for a further partial flue gas stream to be branched off so that the aforementioned advantages may also be achieved for the air preheater arranged behind the electrostatic filter.

In an alternative embodiment of the present invention the preheater arranged downstream of the electrostatic filter is arranged with its heat-receiving part within the main flue gas line and with its heat-dissipating part within the combustion airline whereby both parts are connected by pipelines. A heat carrying medium, preferably water, circulates within the closed system of these pipelines.

In this fashion the use of a further amount of excess heat present in the flue gas before entering the desulfurization device is possible whereby according to a further embodiment of the invention it is expedient to connect a steam-heated auxiliary heat exchanger to the pipelines of the preheater, the heat exchanger serving to supply required heat to the combustion air, if necessary or if the second preheater fails.

According to further features of the invention, the steam generated by the excess heat may be used directly for heating purposes, either for a separate heating system or for heating the heat exchangers of the power plant. Alternatively, it is also possible to use the steam generated by excess heat by introducing it into the turbine of the power plant or by introducing it into an auxiliary turbine. Preferably this auxiliary turbine is a dual pressure turbine because the steam generators of the two bypass lines generate steam of different pressures.

In another preferred embodiment of the present invention the device is comprised of two air preheaters one arranged upstream and one arranged downstream of the electrostatic filter and each having a bypass line. Each bypass line further comprises at least one steam generator heated by the respective partial flue gas stream present in the bypass line. According to an inventive embodiment a steam superheater, coordinated with the first steam generator, and a second steam superheater, coordinated with the second steam generator, are arranged within the bypass line of the first air preheater connected upstream of the electrostatic filter. With this embodiment an overheating of the steam resulting from the bypass line with the lower temperature level is possible. Downstream of the two steam generators, respectively, steam superheaters a dual pressure turbine is preferably provided.

It is furthermore suggested with the present invention to provide control valves within the bypass lines so that the flue gas flow through the main flue gas line and the bypass lines may be divided in a controlled manner and that furthermore a closure of the bypass lines is possible.

DESCRIPTION OF PREFERRED EMBODIMENTS

The present invention will now be described in detail with the aid of several specific embodiments utilizing FIGS. 1 and 2.

The schematic representations show for example a steam generator 1 to be fired with brown coal. The combustion air which is introduced via combustion air line 2 is preheated by two air preheaters 3 and 4 before its introduction into the steam generator. These air preheaters 3 and 4 are heated by flue gas 5 which leaves the steam generator 1 via the main flue gas line 6. In this main flue gas line 6 an electrostatic filter 7 is arranged between the two air preheaters 3 and 4. The main flue gas line 6 leads into a flue gas desulfurization device 8 from which the desulfurized flue gas is guided into a cooling tower 9 in both embodiments. From the cooling tower 9 the flue gas is released into the atmosphere.

In the first embodiment according to FIG. 1 each one of the air preheaters 3 and 4 is provided with a bypass line 11 and 12. Both bypass lines 11 and 12 are connected to the main flue gas line 6 via control valves 13. With this measure it is possible that a partial flue gas stream 5a or 5b is branched off from the main flue gas flow. The amount of these partial flue gas flows 5a and 5b is selected such that the remaining flue gas flow corresponds to the amount of combustion air to be heated within the two air preheaters 3 and 4.

Since the two partial flue gas flows 5a and 5b are not used for heating the combustion air 2, their heat energy may be used for generating steam. For this purpose, the bypass line 11 is provided with a steam generator 14 and the bypass line 12 is provided with a steam generator 15. The two steam generators 14 and 15 are connected to a common feed water line 16 and each one of the steam generators has connected thereto downstream a steam superheater 17, respectively, 18. The steam superheater 17 of the steam generator 14, viewed in the direction of flow of the partial flue gas flow 5a, is arranged upstream of the steam superheater 18. The steam superheater 18 of the steam generator 15 in this embodiment is arranged within the bypass line 11 downstream of the steam generator 14 when viewed in the flow direction of the partial flue gas flow 5a.

Figure 1B:
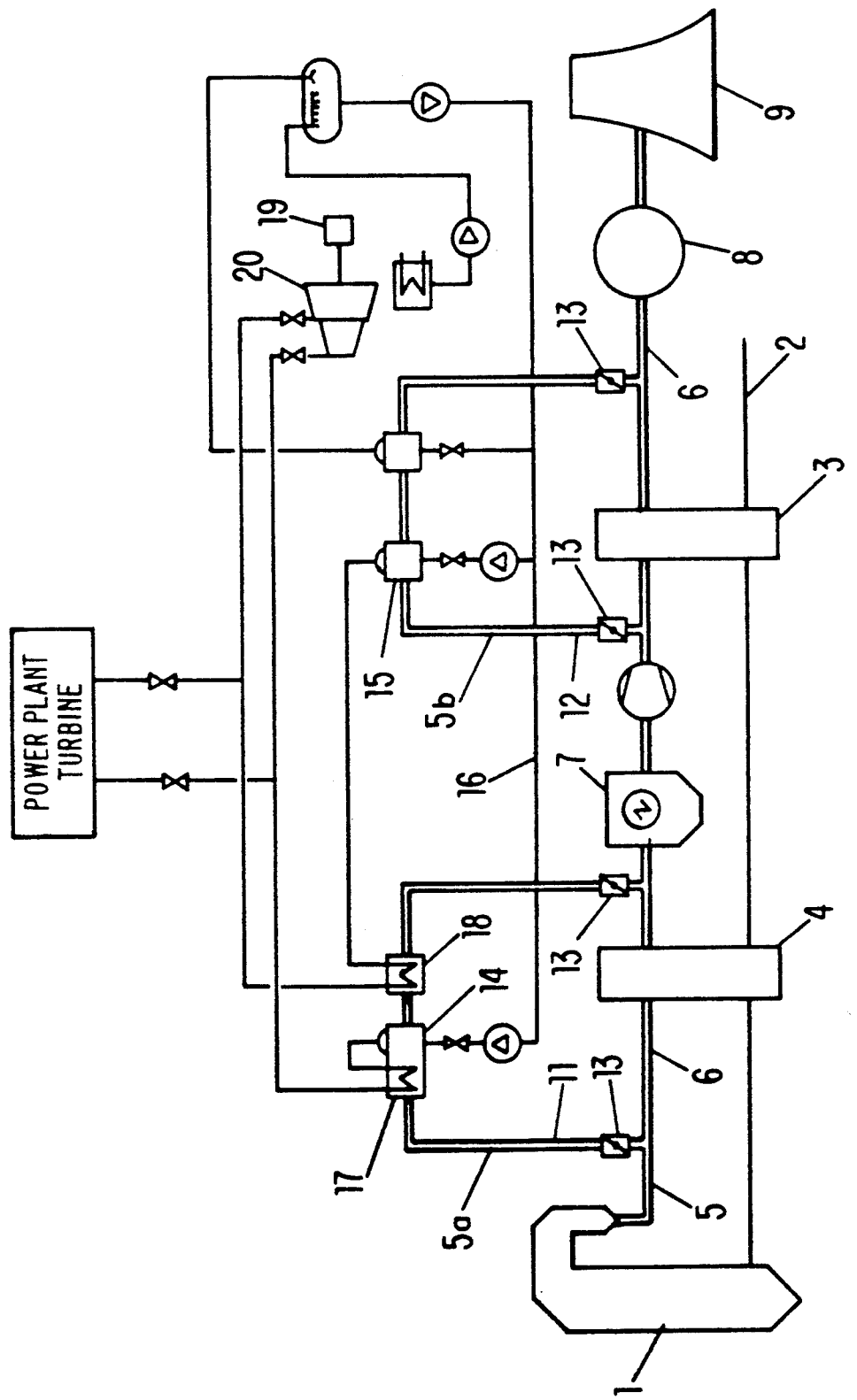
FIG. 1b shows a further variant of the first embodiment in which the steam is used for operating a power plant turbine.

The steam that is generated by the two steam generators 14 and 15 may be used directly for heating purposes, for example for a separate independent heating system or for heating the heat exchangers of the heating system of the power plant (FIG. 1a), or may be introduced into a turbine for generating electricity (FIG. 1b). In the latter case it is possible to introduce the generated steam into the already present turbine of the power plant or into an auxiliary turbine, as is shown in FIGS. 1a and 1b. This turbine which drives a generator 19 is preferably a dual pressure turbine 20 because the steam generated by the steam generators 14 and 15 usually have different pressures.

Independent of the use of the generated steam from the steam generators 14 and 15, the aforementioned method provides an economical use of the excess heat within the flue gas 5 that is not needed for the operation of the flue gas desulfurization device. The amount of excess heat is determined by the excess amount of flue gas volume relative to the volume of the combustion air and by the required difference of the flue gas temperature to the acid dew point.

Figure 2A:
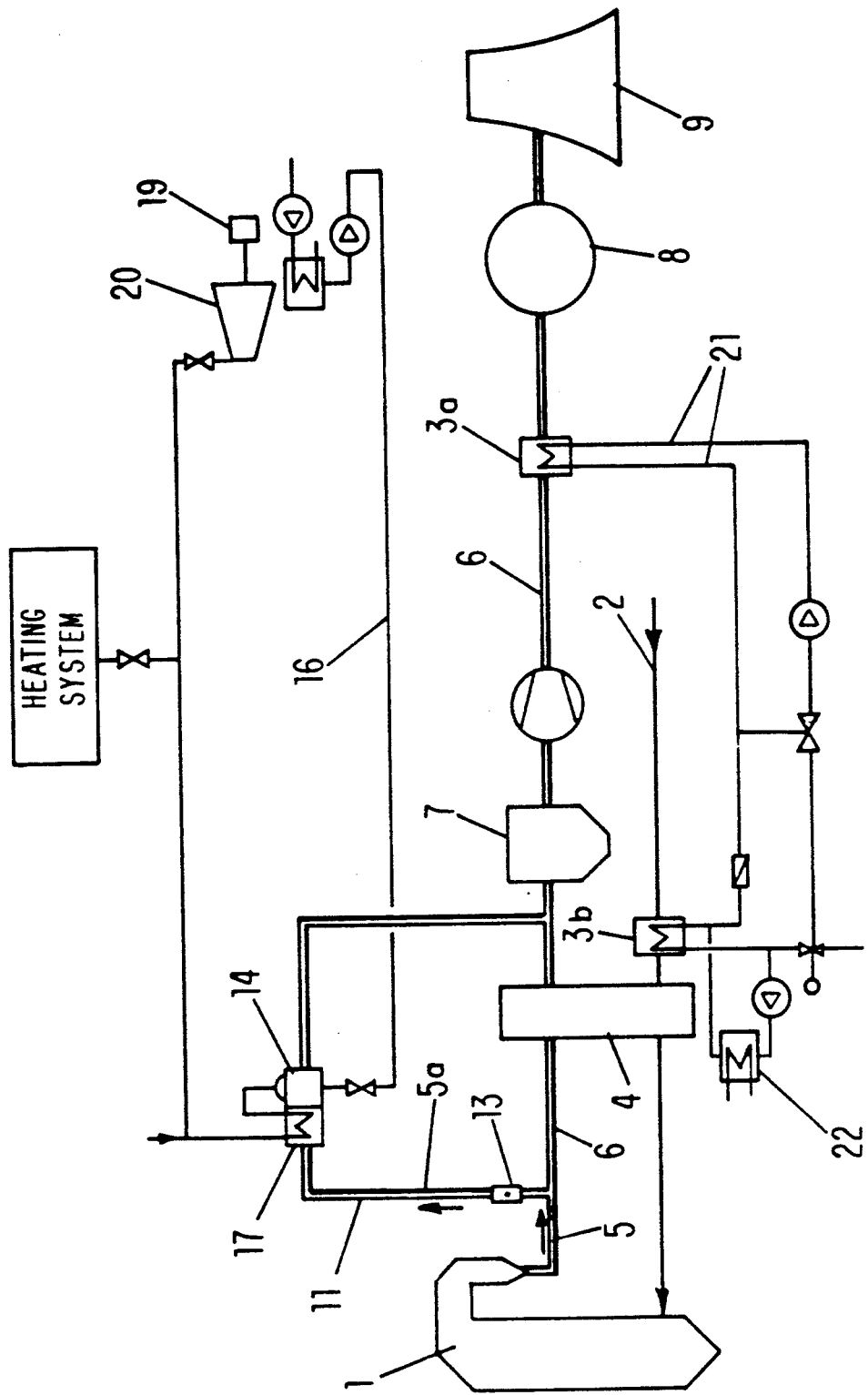
FIG. 2a shows a variant of the second embodiment in which the steam is used for heating.
Figure 2B:
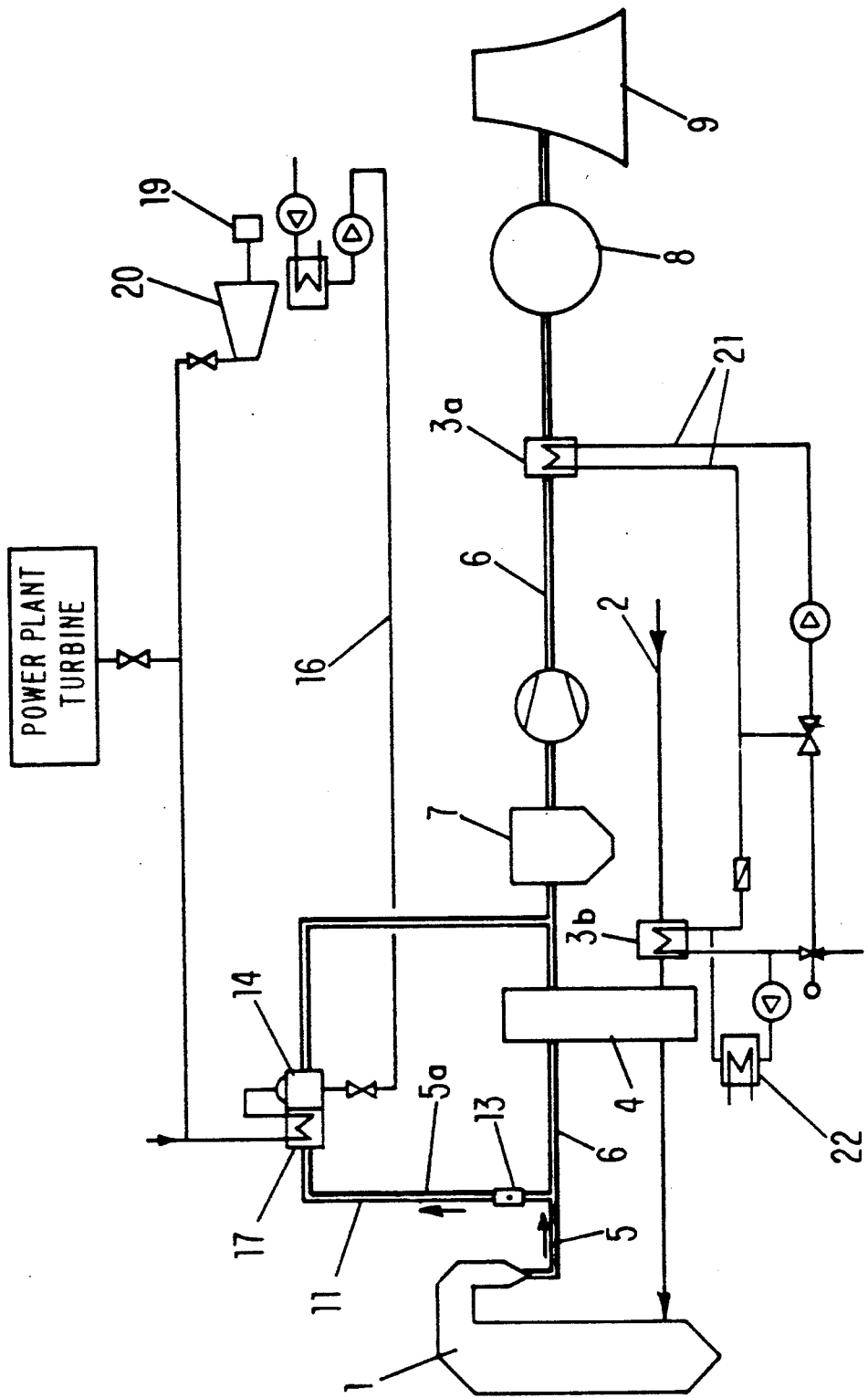
FIG. 2b shows a further variant of the second embodiment in which the steam is used for operating a power plant turbine.

The second embodiment according to FIGS. 2a and 2b differs from the first embodiment by providing the air preheater arranged downstream of the electrostatic filter 7 in the form of a heat-receiving part 3a which is arranged within the main flue gas line 6 and a heat-dissipating part 3b which is arranged within the combustion air line 2, the two parts being connected to one another by pipelines 21. Within the closed system of these pipelines 21 a heat carrier medium is circulated. The heat carrier medium is preferably water. In order to be able to provide the required energy for heating the combustion air, if needed or if the second air preheater fails, a steam-heated auxiliary heat exchanger 22 is connected to the pipelines 21, as can be seen in FIGS. 2a and 2b.

The present invention is, of course, in no way restricted to the specific disclosure of the specification and drawings, but also encompasses any modifications within the scope of the appended claims.

What we claim is:

1. A method for using excess heat of flue gas, said excess heat not required for operating a flue gas desulfurization device of a power plant, said method comprising the steps of:
   guiding the flue gas through a main flue gas line into an electrostatic filter before introducing the flue gas into the flue gas desulfurization device;
   guiding the flue gas through a first and a second air preheater before introducing the flue gas into the flue gas desulfurization device;
   arranging said first and said second air preheaters upstream and optionally downstream of said electrostatic filter in the main flue gas line;
   branching off a partial flue gas stream at least before one of said first and second air preheaters that is arranged upstream of said electrostatic filter, said partial flue gas stream corresponding approximately to said excess heat; and
   using said partial flue gas stream for generating steam.

2. A method according to claim 1, further comprising the step of branching off a further partial flue gas stream corresponding approximately to said excess heat at the other one of said first and said second preheaters for generating steam.

3. A method according to claim 1, further comprising the step of using the steam for heating.

4. A method according to claim 1, further comprising the step of introducing the steam into the turbine of the power plant.

5. A method according to claim 1, further comprising the steps of:
   providing an auxiliary turbine; and
   introducing the steam into said auxiliary turbine.

6. A method according to claim 5, wherein said auxiliary turbine is a dual pressure turbine.

7. A device for using excess heat of flue gas, said excess heat not required for operating a flue gas desulfurization device of a power plant, said device comprising:
   a main flue gas line connected to the desulfurization device;
   an electrostatic filter connected upstream of the desulfurization device within said main flue gas line;
   a first air preheater connected upstream of said electrostatic filter within said main flue gas line and a second air preheater connected downstream of said electrostatic filter and upstream of the desulfurization device within said main flue gas line; and
   a first bypass line connected upstream of said first air preheater to said main flue gas line for branching off a partial flue gas stream corresponding approximately to said excess heat.

8. A device according to claim 7, further comprising a control valve within said first bypass line.

9. A device according to claim 7, wherein said second preheater further comprises:
   a heat-receiving part and a heat-dissipating part, said heat-receiving part connected to said main flue gas line and said heat-dissipating part connected to a combustion air line of the power plant; and
   pipelines connecting said heat-receiving part and said heat-dissipating part to one another.

10. A device according to claim 9, further comprising a steam-heated auxiliary heat exchanger connected to said pipelines.

11. A device according to claim 7, wherein said partial flue gas stream is used for generating steam.

12. A device according to claim 11, wherein the steam is used for heating.

13. A device according to claim 11, wherein the steam is introduced into a turbine of the power plant.

14. A device according to claim 11, further comprising an auxiliary turbine and wherein the steam is introduced into said auxiliary turbine.

15. A device according to claim 14, wherein said auxiliary turbine is a dual pressure turbine.

16. A device according to claim 7, further comprising a second bypass line connected upstream of said second preheater within said main flue gas line for branching off a further partial flue gas stream corresponding approximately to said excess heat.

17. A device according to claim 16, further comprising a first control valve within said first bypass line and a second control valve within said second bypass line.

18. A device according to claim 16, further comprising a first steam generator, coordinated with a first steam super heater, connected within said first bypass line and a second steam generator, coordinated with a second steam super heater, connected within said second bypass line, said first and said second steam super heaters connected within said first bypass line.

19. A device according to claim 16, wherein said partial flue gas streams are used for generating steam.

20. A device according to claim 19, wherein the steam is used for heating.

21. A device according to claim 20, wherein the steam is introduced into a turbine of the power plant.

22. A device according to claim 19, further comprising an auxiliary turbine and wherein the steam is introduced into said auxiliary turbine.

23. A device according to claim 22, wherein said auxiliary turbine is a dual pressure turbine.

* * * * *